(12) United States Patent
Jadiyappa

(10) Patent No.: US 8,787,649 B2
(45) Date of Patent: Jul. 22, 2014

(54) SYSTEM AND METHOD FOR PROCESSING AN X-RAY IMAGE OF AN ORGAN

(75) Inventor: Rajendra Prasad Jadiyappa, Bangalore (IN)

(73) Assignee: Siemens Aktiengesellschaft, München (DE)

( * ) Notice: Subject to any disclaimer, the term of this patent is extended or adjusted under 35 U.S.C. 154(b) by 151 days.

(21) Appl. No.: 13/527,866

(22) Filed: Jun. 20, 2012

(65) Prior Publication Data

US 2012/0328174 A1 Dec. 27, 2012

(30) Foreign Application Priority Data

Jun. 24, 2011 (IN) .............................. 842/KOL/2011

(51) Int. Cl.
*G06K 9/00* (2006.01)
*G06K 9/62* (2006.01)
*G06K 9/36* (2006.01)
*G06T 7/00* (2006.01)

(52) U.S. Cl.
CPC ..... *G06T 7/0012* (2013.01); *G06T 2207/30048* (2013.01); *G06T 2207/10121* (2013.01); *G06T 2207/10016* (2013.01); *G06T 2207/20128* (2013.01)
USPC .............................. 382/132; 382/215; 382/284

(58) Field of Classification Search
USPC .......................................... 382/132, 215, 284
See application file for complete search history.

(56) References Cited

U.S. PATENT DOCUMENTS

| | | | |
|---|---|---|---|
| 7,693,563 B2 * | 4/2010 | Suresh et al. ................. | 600/407 |
| 7,697,972 B2 | 4/2010 | Bzostek | |
| 7,773,785 B2 * | 8/2010 | Murphy et al. ............... | 382/128 |
| 8,059,878 B2 * | 11/2011 | Feilkas et al. ................. | 382/131 |
| 8,121,371 B2 * | 2/2012 | Dewaele ........................ | 382/128 |
| 8,150,138 B2 * | 4/2012 | Ohnishi ........................ | 382/134 |
| 8,538,117 B2 * | 9/2013 | Najarian et al. .............. | 382/131 |
| 2008/0039713 A1 * | 2/2008 | Thomson et al. ............. | 600/411 |
| 2009/0123053 A1 * | 5/2009 | Mundy et al. ................. | 382/132 |

OTHER PUBLICATIONS

Sra J1, Krum D, Malloy A, Vass M, Belanger B, Soubelet E, Vaillant R and Akhtar M, "Registration of three-dimensional left atrial computed tomographic images with projection images obtained using fluoroscopy", Circulation. Dec. 13, 2005; 112(24):3763-8.*

* cited by examiner

*Primary Examiner* — Utpal Shah

(57) ABSTRACT

A system and a method for indicating at least one of the internal structures of an organ on an X-ray image are proposed. The system includes an interface adapted to receive the X-ray image and a non-X-ray image pertaining to the organ. The system also includes a database having a geometric model of the internal structures of the organ, a first module for determining at least a dimension of one of the internal structures of the organ from the non-X-ray image, and a second module for indicating the at least one of the internal structures of the organ in the X-ray image based on the geometric model adjusted by the at least one dimension.

14 Claims, 4 Drawing Sheets

SYSTEM AND METHOD FOR PROCESSING AN X-RAY IMAGE OF AN ORGAN

CROSS REFERENCE TO RELATED APPLICATIONS

This application claims priority of India application No. 842/KOL/2011 filed Jun. 24, 2011, which is incorporated by reference herein in its entirety.

FIELD OF INVENTION

The present application relates to a system and a method for processing an X-ray image of an organ.

BACKGROUND OF INVENTION

Physicians use X-ray images for diagnosis, medical interventions, surgical procedures, et cetera. For example, in fluoroscopy a series of live X-ray images are displayed during an intervention to give an orientation to the physicians. One of the widely used interventions is a catheter based treatment of the heart termed as Valvuloplasty. X-ray images enhance the visualisation of bones and hard tissues in comparison with organs, whereas they provide only a faint outline of the organ. This leads to a situation wherein the internal structures of the organ are not being easily identifiable by X-ray images, as they are not indicative in the X-ray image.

U.S. Pat. No. 7,697,972 relates to an image guided navigation system for tracking the location of a catheter in a region of a patient based on multiple fluoroscopic images of the region. Exposing a patient to fluoroscopy throughout the intervention exposes both the patient and radiographers to harmful radiation.

SUMMARY OF INVENTION

The present application seeks to process an X-ray image of an organ to increase the visibility of internal structures of the organ in the X-ray image.

The above objective is achieved by a system and a method according to the claims.

The visibility of an internal structure of an organ in an X-ray image of the organ is enhanced by determining a dimension of the internal structure from a non-X-ray image of the organ, retrieving a geometric model of the internal structure, which substantially coincides with the determined dimension, from a database of geometric models of the internal structure based on different dimensions of the internal structures, adjusting the geometric model for obtaining an approximate physical representation of the internal structure, and indicating the adjusted geometric model of the internal structure on the X-ray image of the organ.

In an embodiment, the database of the system has a plurality of geometric models of the one of the internal structures of the organ based on a plurality of characteristics of a patient—for example, age, sex, body surface area, race, et cetera, because the dimensions of the internal structures vary based on the aforesaid characteristics, so that the geometric model chosen from the database, based on the determined dimension for indicating the internal structure of the organ, is adjusted depending on the characteristics of the patient for obtaining a good starting point for indicating the internal structure on the X-ray image.

In another embodiment, the database of the system has a multitude of geometric models of the corresponding internal structures pertaining to different types of organ—for example, heart, liver, kidney, et cetera, so that the system with the database is used for indicating different internal structures corresponding to different types of organs mandating only marginal modifications to the imaging system.

In yet another embodiment, the second module is adapted to derive the periphery of the organ from the X-ray image received for aligning the geometric model of the one of the internal structures of the organ with respect to the periphery of the organ for indicating the internal structures in the X-ray image, as the periphery of the organ is easily identified from the X-ray image and is a good reference for aligning the internal structure based on the geometric model to get an accurate alignment of the internal structures in the geometric model with the actual internal structure of the organ.

In yet another embodiment, the second module is adapted to project a 2D representation of the geometric model of the internal structures of the organ on the X-ray image of the organ, thereby supporting the projection of any of the type of geometric models of the internal structures stored in the database on the X-ray image, as the 2D representation of the any of the type of geometric models is the one that is projected on the X-ray image.

In yet another embodiment, the interface of the system is integrated with an X-ray imaging device for acquiring the X-ray image. In yet another variation of the embodiment, the interface of the system is further integrated with a non-X-ray imaging device for acquiring the non-X-ray image of the organ, thereby rendering the system the additional capability of generating X-ray images and non-X-ray images of the organ of the patient along with processing the X-ray and the non-X-ray images. These enhance the capability of the system by providing a complete solution during a surgical, a therapeutic or a diagnostic procedure, whereby the X-ray and non-X-ray images pertaining to the organ of the patient are procured by the system and are processed for indicating the one of the internal structures of the organ in the X-ray image based on the geometric model retrieved from the database.

In an embodiment, the geometric model is adapted in the at least one dimension of the one of the internal structures of the organ for generating a geometric model that substantially coincides with the at least one dimension of the one of the internal structures of the organ of the patient, which enhances the accuracy of the indication of internal structures of the organ on the X-ray image adapted to the characteristics of the patient.

In another embodiment, the geometric model of the one of the internal structures of the organ based on the at least one dimension is superimposed on the X-ray image of the organ for indicating the at least one of the internal structures of the organ in the non-X-ray image onto the X-ray image, which renders increased identifiableness of the internal structures of the organ on the X-ray image.

In yet another embodiment, the periphery of the organ is derived from the X-ray image for using it as a reference for aligning the geometric model of the at least one of the internal structures of the organ, which enhances the visual clarity of depicting the one of the internal structures of the organ on the X-ray image when indicated based on the periphery of the organ.

In yet another embodiment, the image obtained by indicating the at least one of the internal structures of the organ based on the at least one dimension on the X-ray image pertaining to the organ is displayed, which illustrates the internal structures of the organ generated from the non-X-ray image on the X-ray image of the organ renders assistance during medical interventions, surgical procedures, administering medicines, diagnostic procedures, et cetera.

In yet another embodiment, at least one of the internal structures of a heart is indicated on an X-ray image of the heart. In a variation of this embodiment, at least a dimension of one of the internal structures—a ventricle, an atrium, a chamber, an artery, a valve, an auricle, a vein, an aorta, a brevis, a cava, and their combinations, is determined from a non-X-ray image of the heart, which renders assistance during a surgical procedure, a medical intervention, or diagnosis, et cetera related to the cardiac region.

The aforementioned and other embodiments of the application related to the system and the method for processing the X-ray image will now be addressed with reference to the accompanying drawings of the present application. The illustrated embodiments are intended to illustrate, but not to limit the application. The accompanying drawings contain the following figures, in which like numbers refer to like parts, throughout the description and drawings.

BRIEF DESCRIPTION OF THE DRAWINGS

The figures illustrate in a schematic manner further examples of the embodiments of the application, in which.

DETAILED DESCRIPTION OF INVENTION

Figure 1:
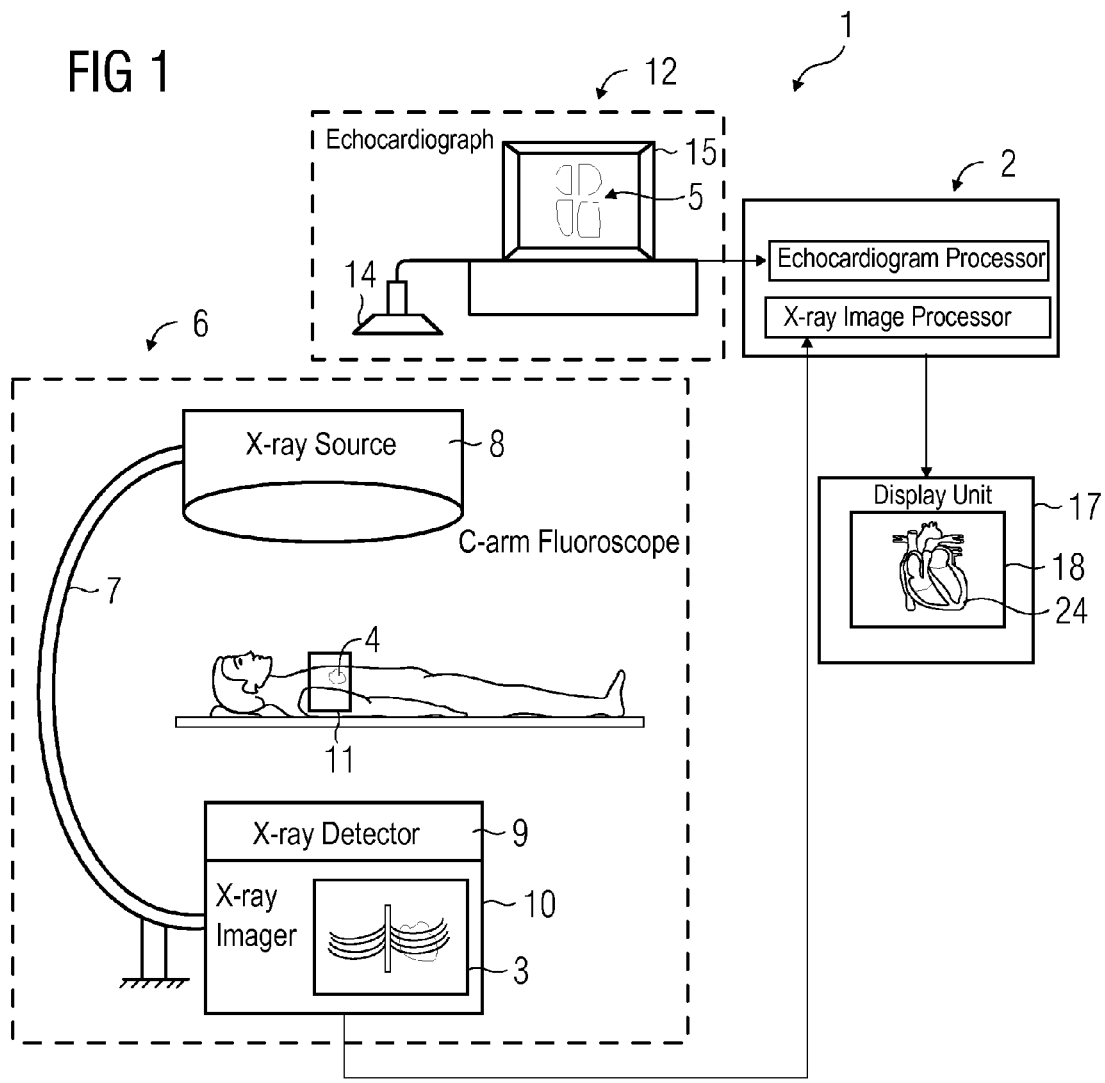
FIG. 1 depicts a clinical room having the system processing an X-ray image and an echocardiogram of the cardiac region of the patient, integrated with the system is an X-ray machine, an echocardiograph, and a display unit.

A clinical room 1 with the system 2 for processing the X-ray image 3 of the heart 4 of the patient for indicating at least one of the internal structures 5 of the heart 4—left ventricle, right ventricle, aorta, septum, et cetera, of the patient that is in an embodiment is illustrated in FIG. 1. The system 2 is integrated with a C-arm fluoroscope 6—an X-ray imaging device primarily comprising a C-shaped beam 7 integrated with an X-ray source 8 and an X-ray receiver 9 along with a digital flat-panel X-ray imager 10, for capturing at least an X-ray image 3 of the cardiac region 11 of the patient. The system 2 is also integrated with an echocardiograph 12—a non-X-ray imaging device primarily comprising an ultrasound device 13 and an ultrasound probe 14 along with a visual display unit 15, for indicating an echocardiogram 16 of the patient. The system 2 is adapted to receive X-ray images 3 and echocardiograms 16 captured from the fluoroscope 6 and the echocardiograph 12 respectively, wherein they are further processed to indicate the internal structures 5 of the heart 4 on the X-ray image 3 of the heart 4. A display unit 17 is integrated with the system 2 for rendering visual depiction of the superimposed image 18 obtained after superimposing the internal structures 5 of the heart 4 on the X-ray image 3 of the heart 4. The system 2 will be elaborated in detail with respect to FIG. 4 and FIG. 5.

The system 2 is capable of working independently by receiving and processing the X-ray images 3 and non-X-ray images 16 for indicating the internal structures 5 of the heart 4 on the X-ray image 3 of the heart 4, and is independent of its integration with the C-arm fluoroscope 6 and echocardiograph 12. Nevertheless, the C-arm fluoroscope 6 integrated with the system 2 for producing digital X-ray images 3 is replaceable with an X-ray Computed Tomography (CT) device, conventional X-ray device producing conventional X-ray images, or any other device that produces X-ray images 3, can be used for producing the X-ray images and integrated with the system. Similarly, the echocardiograph 12 for producing non-X-ray images in the form of echocardiograms 16 integrated with the system 2 can be substituted with any of the devices for producing non-X-ray images, for example, a Magnetic Resonance Imager (MRI), a CT imager, a Positron Emission Tomography (PET) imager, an isocentric fluoroscopy imager, a bi-plane fluoroscopy imager, an ultrasound imager, a multi-slice CT imager, a high-frequency ultrasound imager, an optical coherence tomography imager, an intravascular ultrasound imager, an ultrasound imager, an intra-operative CT imager, an intra-operative MRI, a single photon emission CT imager, et cetera.

Figure 2:
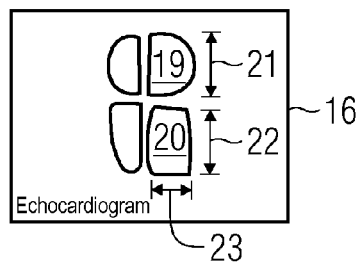
FIG. 2 depicts an echocardiogram of the heart and its internal structures obtained from the echocardiograph referred to in FIG. 1.

FIG. 2 depicts a closer view of the echocardiogram 16 of the patient, where further details of the internal structures 5 of the heart 4 are indicated, for example—left atrium 19, left ventricle 20, et cetera. The bidirectional arrows indicate a plurality of dimensions that correspond to the various internal structures of the heart 4, for example, the length 21 of the left atrium 19, the length 22 of the left ventricle 20, the width 23 of the left ventricle 20, et cetera. The manner in which these dimensions 21-23, which are derived from the non-X-ray image 16, are used for indicating the internal structures 5 of the heart 4 on the X-ray image 3 of the heart 4 will be explained in detail with reference to the FIG. 3-FIG. 8.

Figure 3:
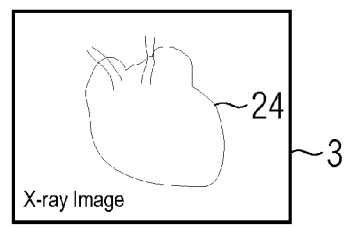
FIG. 3 depicts the periphery of the heart of the patient as seen from the X-ray image of the cardiac region of the patient referred to in FIG. 1.

Periphery 24 of the heart 4 as seen from the X-ray image 3 of the cardiac region 11 of the patient is depicted in FIG. 3, and the periphery 24 so observed is a very faint outline of the heart 4. Furthermore, the X-ray image 3 of the heart 4 does not depict the internal structures 5 of the heart 5 as it is observable from the echocardiogram 16. The objective lies in indicating the internal structures 5 of the heart 4 that are seen on the echocardiogram 16 on the X-ray image 3 of the heart 4, in which the periphery 24 of the heart 4 will be used as the reference to align the internal structures 5 of the heart 4 on the X-ray image 3, and the means of achieving the above objective will be expounded in detail in FIG. 4-FIG. 8.

Figure 4:
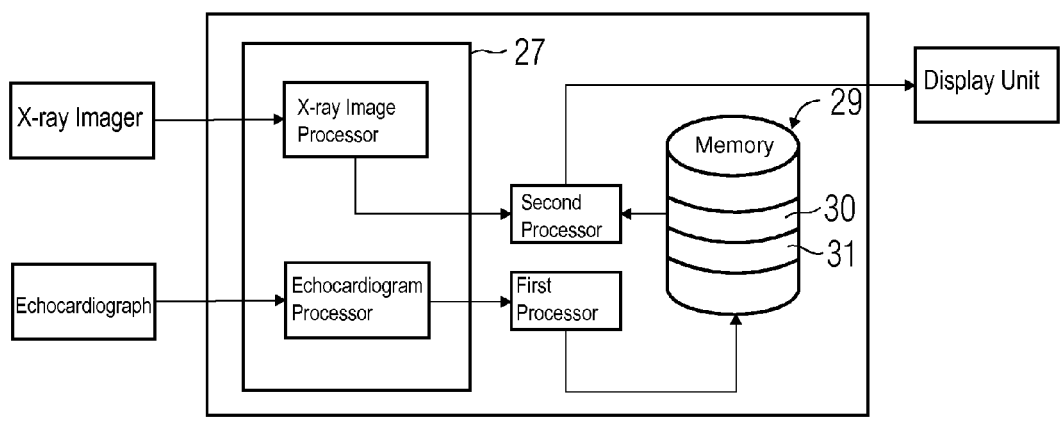
FIG. 4 depicts the various components of the system referred to in FIG. 1 and its interconnections.

FIG. 4 depicts the parts of the system 2 for indicating the internal structures 5 of the heart 4 in another embodiment, wherein the system 2 has an X-ray image processing unit 25 that receives the digital X-ray image 3 of the cardiac region 11 produced from the digital flat panel X-ray imager 10, an echocardiogram processing unit 26 that receives the echocardiogram 16 of the heart 4 from the echocardiograph 12. The combination—the X-ray image processing unit 25 and the echocardiogram processing unit 26, forms the interface 27 of the system 2, thereby rendering the capability to the system 2 for receiving both X-ray images 3 and non-X-ray images 16. The components of the interface 27 for processing the X-ray images 3 and the non-X-ray images 16 can be a processor, or a processor on chip, an integrated chip, a software module capable of processing digital images, et cetera.

The echocardiogram processing unit 26 has a first module 28 connected to the interface 27 for determining at least one of the dimensions 21-23 of the internal structures 5 of the heart 4, and the at least one of the dimensions 21-23 is communicated to a database 29 comprising a plurality of geometric models 30, 31 of the internal structures 5, for retrieving a geometric model 30 of the one of the internal structures 5 of the heart 4 that corresponds to the at least one of the determined dimensions 21-23.

Geometric models 30, 31 of the internal structures 5 are geometric representations of the internal structures 5 of the heart 4, based on various dimensions 21-23 of the internal structures 5 of the heart 4. These models 30, 31 are defined by a plurality of model parameters that correspond to the various dimensions 21-23 of the internal structures of the organ, and the plurality of model parameters are based on the type of modelling used to arrive at the geometric models 30, 31. The modelling methods can either be mathematical, or mesh-based, electromechanical, computational, biomechanical, anatomical, et cetera. Furthermore, the models also depend on other characteristics of the patient—sex, race, age group, body type, et cetera. The geometric models 30, 31 of the internal structures 5 of the heart 4 retrieved from the database 29 based on one or more dimensions 21-23 is capable of substantially defining and emulating the actual physical aspects—shape, thickness, orientation, et cetera, of the internal structures 5 of the heart 4. The database 29 renders two dimensional (2D) representations of the geometrical models 30, 31, which facilitate the representation of the internal structures 5 of the heart 4 on the X-ray image 3, which is a 2D image represented on a 2D plane.

With reference to FIG. 2 and FIG. 4, the dimensions 21-23 of the internal structures 5 of the heart 4 can either be determined manually (not shown) or determined automatically (not shown) using the first module 28. The first module 28 may comprise a visual interface (not shown) with image markers and cursors (not shown), which facilitate the manual determination of the dimensions 21-23 of the internal structures 5 of the heart 4—the distance between two extreme chosen points on the left ventricle 20 along the longitudinal axis of symmetry (not shown) of the left ventricle 20 on the echocardiogram 16 in FIG. 2 corresponds to the Euclidean distance between the two points, which can be construed as the length 22 of the left ventricle 20 of the patient. In a further example, the first module 28 may comprise an image processing unit (not shown)—capable of segmenting and processing non-X-ray images 16, which measures distances that correspond to the distance between two chosen pixels (not shown), which indicates two different points on the internal structure 5 of the heart 4 as depicted by FIG. 2, for example, the image processing unit determines the width 23 of the left ventricle 20 by processing the non-X-ray image 16 corresponding to internal structures 5 of the heart 4, in this case by processing the echocardiogram 16 of the patient.

The corresponding geometric model 30 retrieved from the database 29 is fed to a second module 32 of the system 2, which further adjusts the geometric model 30 of the internal structures 5 of the heart 4 for indicating the internal structures 5 of the heart 4 on the X-ray image 3 of the heart 4. The various components of the second module 32 will be expounded with reference to FIG. 5, and the structure and the hierarchy of the database 29 comprising the geometric models 30, 31 will be explained with reference to FIG. 6, which put together perform the aforesaid to accomplish the objective.

Figure 5:
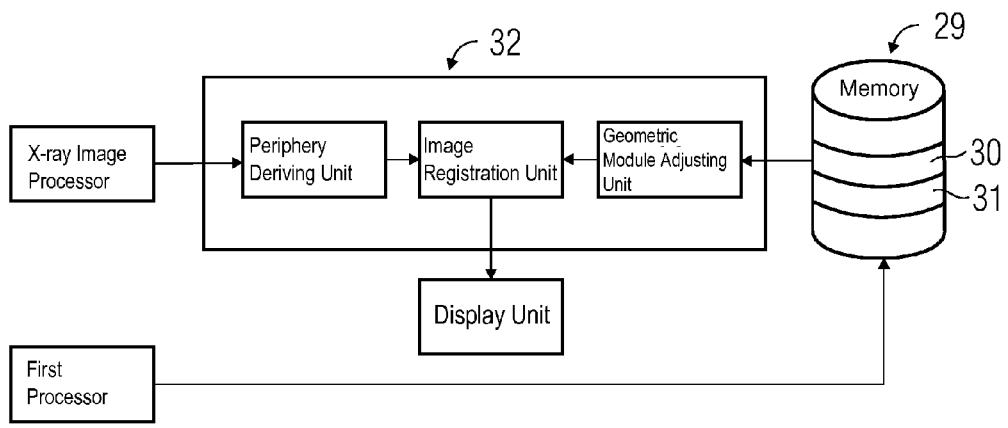
FIG. 5 depicts the various components of the second module of the system referred to in FIG. 4 and its interconnections.

The various components of the second module 32—a geometric model adjusting unit 33, a periphery deriving unit 34, and an image registration unit 35, are illustrated in FIG. 5. The geometric model adjusting unit 33 of the second module 32 retrieves the geometric model 30 from the database 29 that substantially corresponds to at least one of the determined dimensions 21-23 of the internal structures 5 of the heart 4 of the patient, and further adjusts the retrieved geometric model 30 to coincide with the actual dimensions 21-23 of the internal structures 5 of the heart 4 of the patient. These adjustments to the geometric model 30 are to be construed as minor variations to the physical aspects of the internal structures 5—shape, size, orientation, wall thickness, et cetera, represented by the retrieved geometric model 30, in order to make it coincide with the actual determined dimensions 21-23 of the internal structures 5 of the heart 4 of the patient, for obtaining a very close geometrical representation of the internal structures 5 of the heart of the patient. These adjustments can be effectuated by image processing algorithms used for extrapolation and reshaping to adjust existing geometric models 30, 31 based on required dimensions 21-23. The adjusted model—the geometrical model 30 obtained after performing the aforementioned adjustments may be stored in another database, which can be accessed and recalled for indicating the internal structures 5 of the heart 4 on the X-ray image 3 of the heart 4.

The periphery deriving unit 34 receives the X-ray image 3 corresponding to the heart 4, and processes the X-ray image 3 to derive the periphery 24 of the heart 4—a 2D outline of the heart 4, which is used for aligning the geometrical model 30 of the internal structures 5 of the heart 4 obtained from the database 30 based on the dimensions 21-23 of the internal structure 5 determined from the echocardiogram 16 of the patient. For example, the periphery deriving unit 34 may comprise image processing modules applied on the digital X-ray image 3 of the cardiac region 11 for detecting the boundary of the heart 4 leading to the derivation of periphery 24 of the organ. In another example, derivation of the periphery 24 can be based on segmentation of the digital X-ray image 3 and then applying boundary detection techniques to derive the periphery 24 of the heart 4 in the X-ray image 3. The derived periphery 24 is rendered to image registration unit 35, which registers the adjusted geometric model 30 of the internal structure 5 of the heart 4 on to the X-ray image 3, by aligning and orienting the geometric models 30, 31 of the internal structures 5 of the heart 4 based on the dimensions 21-23 determined, by taking the periphery 24 of the heart 4 as a reference, in a manner such that the geometrical models 30, 31 of the internal structures 5 along with the periphery 24 accurately represents the manner in which the internals structures 5 are found inside the heart 4, which is depicted in FIG. 7a-7c. The image registration unit 35 can also superimpose or project the geometric models 30, 31 of the internal structures 5 of the heart 4 onto the periphery 24 of the heart 4, with the objective of depicting the internal structures 5 of the heart 4 in an indicative manner as to how the internal structures 5 are present inside the heart 4 in FIG. 7a-7c.

Figure 6:
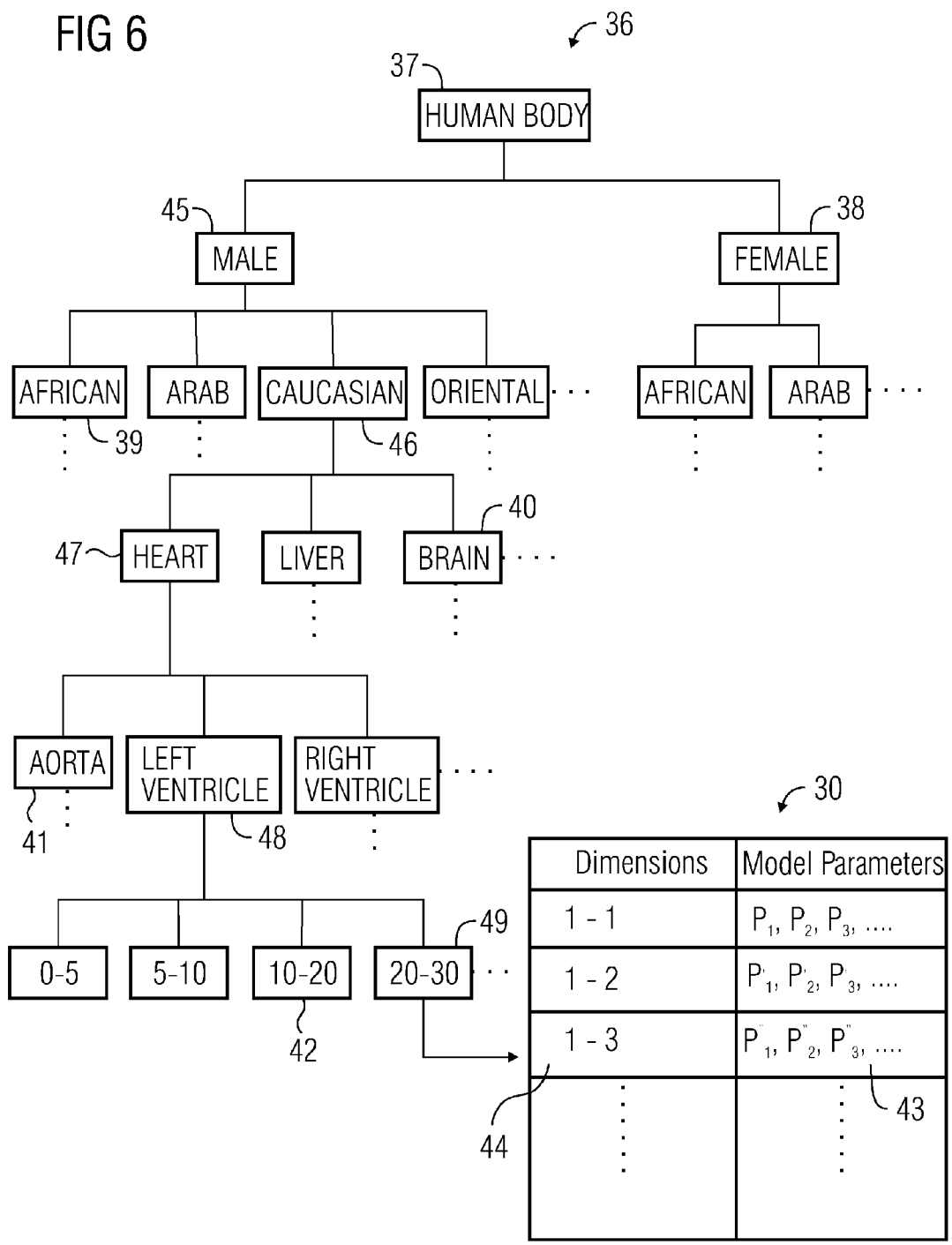
FIG. 6 depicts a hierarchical structure of a database in the system referred to FIG. 1 having a plurality of geometric models of the internal structures of a heart based on a plurality of characteristics of the patient.
Figure 7:
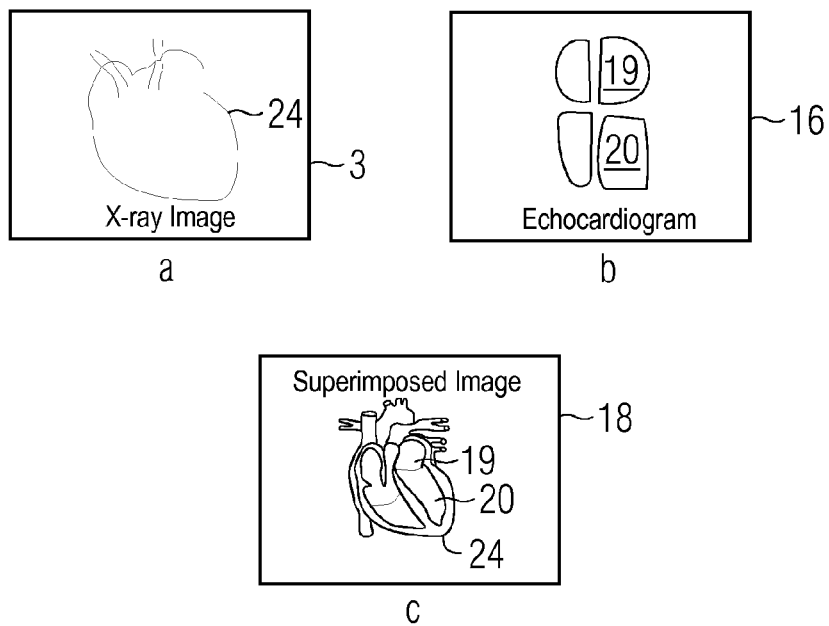
FIG. 7a-7c depicts the registration of the geometric models of the internal structures of the heart on to image of the periphery of the heart referred to in FIG. 3.

The database 29 of the geometric models 30, 31 of the internal structures 5 of the heart 4 of the patient in an embodiment is illustrated in FIG. 6, where the architecture and hierarchy of the database 29 is implemented as a tree data structure 36, with a root node 37 and a plurality of parent and child nodes 38-42. The root node 37 indicates that the database 29 comprises geometrical models 30, 31 of internal structures 5 of organs found in a human body, and this database 29 is primarily segmented into two broad categories based on sex—male and female, and the further levels of stratifications in the individual categories are done based on the plurality of characteristics of the patient—race, organ type, internal structure of the organ, age group, et cetera.

Standard geometrical models 30, 31 of the internal structures of the organ of the patient defined by a set of standard model parameters 43 corresponding to a standard dimension 44 of the internal structure 5—varying across demography, are stored in the database 29 in the form of a list. The set of standard model parameters 43 are based on the modelling methods used to arrive at the geometric models 30, 31 of internal structures 5 of the organ 4. These geometric models 30, 31 can be either 2D, or 3D, et cetera, and are capable of being represented as 2D models for further processing and for indicating these models 30, 31 on the X-ray image 3 of the organ 4, and can be modelled using mathematical, electromechanical, mesh, biomechanical methods, et cetera.

The set of standard model parameters 43 pertaining to the standard dimension 44 of the internal structure 5 of the organ 4 is stored in a hierarchical manner and to access the set of standard model parameters 43 the database 29 is traversed in an orderly manner. For example, for obtaining the set of model parameters 43 of the left ventricle 20 measuring 1.32 centimeters in length 22, for a 25-year old Caucasian male patient, the database 29 can be traversed in the path as indicated by the reference sign sequence: 37, 45, 46, 47, 48, and 49, which corresponds to the set of standard model parameters 43 of the left ventricle 20 measuring 1.3 centimeters in length 22 for a Caucasian male belonging to the age group— 20 to 30 years, as this set 43 is the one that substantially coincides with the required dimension 44. The chosen set of standard model parameters 43 is rendered to the geometric model adjusting unit 33 for further adjustment of the set of standard model parameters 43 to generate the geometric model 30 of the left ventricle 20 measuring 1.32 centimeters in length 22 that corresponds to the 25-year old Caucasian male patient.

The database 29 described above and illustrated in FIG. 6 has been implemented as a combination of a tree type data structure 36 and a list type data structure 30, but the database 29 can be implemented in other manners and combinations such as arrays, linked lists, heaps, matrices, queues, multiway trees, et cetera. Additionally, there can be other patient characteristics that may be included in the database 29 depending on the level and detail of stratifications required. Furthermore, as the database 29 is a memory element, it can be realised using hard disk drives, flash memories, processor cache memories, read only memories, or its combinations, et cetera.

FIG. 7a-7c depicts the process of superimposing the adjusted geometrical models 30, 31 of the internal structures 5 of the heart 4 on the X-ray image 3 of cardiac region 11, by aligning the geometrical models 30, 31—adjusted based on the determined dimensions 21-23 of the internal structure 5 determined from the echocardiogram 16, with the periphery 24 of the heart 4 in a manner such that the localisation of the internal structures 5 on the X-ray image 3 of the heart 4 depict the true manner in which they are located inside the heart 4 of the patient.

All the processing modules and units described above can be integrated into one unit, such as a processor for performing the aforementioned functions or can function separately or can be selectively combined to achieve the aforementioned objective. These units can be embedded into an integrated chip or an Application Specific Integrated Circuit (ASCI), et cetera with inbuilt memory devices or peripheral memory devices to host the database 29.

Figure 8:
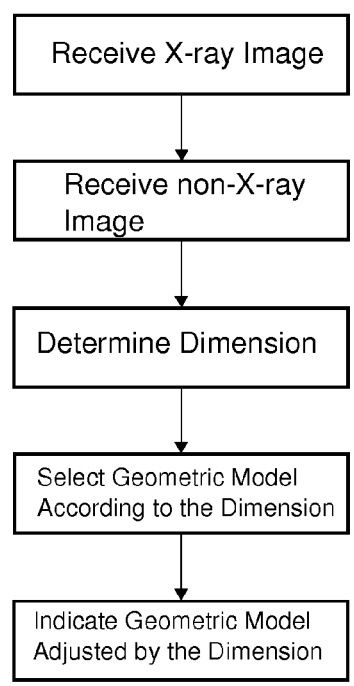
FIG. 8 depicts a flowchart of the method of processing the X-ray image of the organ

A flowchart of the method of processing the X-ray image 3 of an organ—for example, a heart of the patient, in an embodiment has been depicted in FIG. 8. The method involves a step of receiving 50 the X-ray image 3 of the cardiac region 11 and receiving 51 the non-X-ray image 16, determining 52 the dimensions 21-23 of the internal structures 5 of the heart 4 from the non-X-ray image 16, referring 53 to the database 29 of geometric models 30, 31 of the internal structures 5 of the heart 4 and retrieving the geometric model 30 corresponding to the determined dimensions 21-23 and adjusting the geometric model 30 based on the determined dimensions 21-23 and indicating 54 the geometrical model 30 of the internal structures 5 of the heart 4 on the X-ray image 3 of the cardiac region 11.

The non-X-ray image 16—for example an echocardiogram 16 of the patient, is received and processed for determining the different dimensions 21-23 of the internal structures 5 of the heart 4. For example, the ultrasound device 13 can be used to obtain echocardiograms 16 of the heart 4 and an image pertaining to a frame of an echocardiogram 16 can be processed to determine the dimensions of the internal structures 5—either manually or by using image processing modules. Similarly, the X-ray image 3, for example, from the C-arm fluoroscope 6 is processed to determine the periphery 24 of the heart 4. The database 29 comprising a plurality of geometric models 30, 31 of the internal structures 5 of the heart 4 based on various dimensions 21-23 of the internal structures 5 is referred to and the geometric model 30 that substantially corresponds to the determined dimensions 21-23 is retrieved. The retrieved geometric model 30 is adjusted based on the determined dimensions 21-23 of the internal structures 5 of the heart 4 and the geometric model 30 is indicated on the X-ray image 3 of the cardiac region 11, by aligning the geometric model 30 by using the periphery 24 of the heart 4 as reference such that the geometric model 30 of the internal structure 5 when superimposed on the X-ray image 3 accurately depicts the manner in which the internal structure 5 is located inside the heart 4.

The method of processing the X-ray image 3 of the heart 4 by indicating on the X-ray image 3 the internal structures 5 of the heart 4 obtained by processing non-X-ray images 16 of the heart 4 and retrieving appropriate geometric models 30, 31 of the internal structures 5 of the heart 4, it can be used to in performing medical interventions, for example during Valvuloplasty, which involves the insertion of a catheter and puncturing the inter-atria septum to gain access to the mitral valve. The thickness of the septum—one of the internal structures 5 of the heart 4, is determined for accurately puncturing the septum. Furthermore, as the step of indicating involves a process of registration, the database 29 can comprise geometric models 30, 31 of the internal structures 5 of the heart 4 pertaining to different angulations of C-arm fluoroscope 6, so that the registration of the image is doable for any angulations of the C-arm fluoroscope 6. The superimposition of the appropriate geometric models 30, 31 of the internal structures 5 of the heart 4 on to the X-ray image 3 of the cardiac region 11, renders good visibility and identifiableness of the internal structures 5 of the heart 4, and the medical intervention is performed in a facile manner.

Although the application broadly relates to the processing of X-ray images of an organ, and has been specifically explained in terms of processing of X-ray images of the heart, for rendering good clarity to the application, the heart has been taken as an example and the application is extendable to process X-ray images of other organs using non-X-ray images of the other organs by using the description and the aforementioned embodiments. Though the application has been described with reference to specific embodiments, this description is not meant to be construed in a limiting sense. Various examples of the disclosed embodiments, as well as alternate embodiments of the application, will become apparent to persons skilled in the art upon reference to the description of the application. It is therefore contemplated that such modifications can be made without departing from the embodiments of the present application as defined.

The invention claimed is:

1. A system for processing an X-ray image of an organ, comprising:
   an X-ray image processor adapted to receive the X-ray image of the organ and a non-X-ray image processor adapted to receive a non-X-ray image of the organ;
   a memory hosting database comprising a geometric model of an internal structure of the organ;
   a first processor for determining a dimension of the internal structure of the organ from the non-X-ray image; and
   a second processor for indicating the internal structure of the organ in the X-ray image based on the geometric model adjusted by the dimension.

2. The system according to claim 1, wherein the database comprises a plurality of geometric models corresponding to a plurality of internal structures of the organ, wherein the second processor is adapted to select one of the geometric models based on a characteristic of a patient for the adjustment.

3. The system according to claim 1, wherein the database further comprises a plurality of geometric models corresponding to a plurality of internal structures of a plurality of organ types.

4. The system according to claim 1, wherein the second processor is adapted to derive a periphery of the organ from the X-ray image and to indicate the internal structure of the organ in the X-ray image in alignment to the periphery.

5. The system according to claim 1, wherein the second processor is adapted to project a 2D representation of the geometric model of the internal structures of the organ on the X-ray image of the organ.

6. The system according to claim 1, further comprising an X-ray imaging device linked with the interface for acquiring the X-ray image of the organ.

7. The system according to claim 1, further comprising a non-X-ray imaging device linked to the interface for acquiring the non-X-ray image.

8. A method for indicating an internal structure of an organ in an X-ray image of the organ, comprising:
   receiving the X-ray image of the organ and a non-X-ray image of the organ;
   determining a dimension of the internal structure of the organ from the non-X-ray image;
   selecting a geometric model of the internal structure of the organ appropriate with the dimension determined from a database; and
   indicating the internal structure of the organ in the X-ray image based on the geometric model adjusted by the dimension.

9. The method according to claim 8, further comprising adapting the database for receiving the dimension of the internal structure of the organ and mapping the dimension with the geometric model in the database.

10. The method according to claim 8, wherein the internal structure of the organ is indicated in the X-ray image by superimposing the geometric model of the internal structure of the organ on the X-ray image of the organ.

11. The method according to claim 8, wherein a periphery of the organ is derived from the X-ray image for indicating the internal structure of the organ in the X-ray image in alignment to the periphery.

12. The method according to claim 8, further comprising displaying the X-ray image with the internal structure of the organ indicated in the X-ray image.

13. The method according to claim 8, wherein the organ is a heart of a patient.

14. The method according to claim 8, wherein the dimension of the internal structure of the organ comprises a ventricle, an atrium, a chamber, an artery, a valve, an auricle, a vein, an aorta, a brevis, a cava, and a combination thereof.

* * * * *